Sept. 21, 1965     A. S. MATZ, JR., ET AL     3,206,998
REMOTE CONTROL APPARATUS
Filed April 8, 1963     3 Sheets-Sheet 1
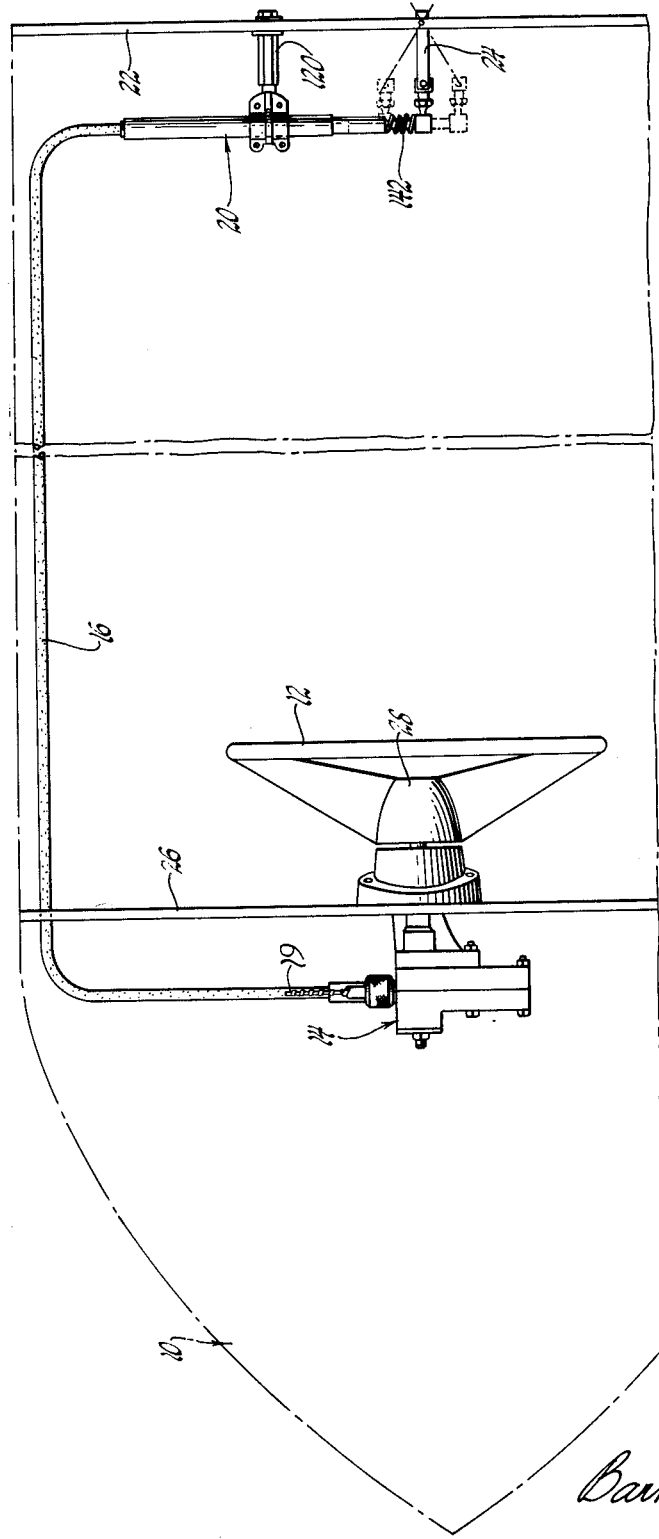
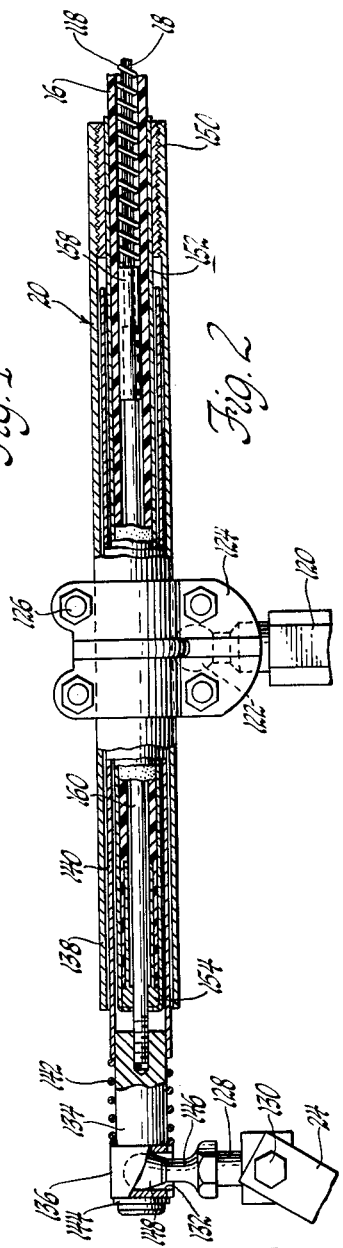
INVENTORS
Allen S. Matz Jr., &
Raymond W. Hill
BY Barnard, McGlynn & Reising
ATTORNEYS INVENTORS
Allen S. Matz Jr. &
Raymond W. Hill
BY Barnard, McGlynn & Leising
ATTORNEYS Sept. 21, 1965 A. S. MATZ, JR., ETAL 3,206,998
REMOTE CONTROL APPARATUS
Filed April 8, 1963 3 Sheets-Sheet 3

INVENTORS
Allen S. Matz Jr., &
BY Raymond W. Hill
Barnard, McGlynn & Leising
ATTORNEYS

United States Patent Office 3,206,998
Patented Sept. 21, 1965

3,206,998
REMOTE CONTROL APPARATUS
Allen S. Matz, Jr., Cornwells Heights, and Raymond W. Hill, Sellersville, Pa., assignors to Teleflex Incorporated, North Wales, Pa., a corporation of Delaware
Filed Apr. 8, 1963, Ser. No. 271,317
17 Claims. (Cl. 74—494)

The present invention relates to a remote control apparatus which is particularly adapted to transmit motion from a driver or operator controlled station to a remotely located member through an intermediate flexible driving cable. While of general applicability, the present apparatus is particularly applicable to a marine steering system.

Primarily in the field of pleasure boats, either inboard or outboard, it has long been a problem to provide a mechanical steerer having the requisite strength to withstand the considerable steering loads encountered in such an environment and yet which steerer is reasonably compact and economical to manufacture. Particularly with the advent of large outboard motors, frequently used in pairs, the loads to which a mechanical steerer is subjected are considerable. Until the development of the subject invention, mechanical steerers available to the public have been bulky, heavy and relatively costly devices.

The bulk, weight and complication of previously available mechanical steerers has created many problems for both the boat manufacturer and owner. One of the primary problems with such bulky mechanical steerers has been the necessity for allocating sufficient space for the steerer in the operator controlling area and which, in turn, frequently limits the number of places where the steerer can be positioned. The subject device is sufficiently compact to result in a considerable diminution in the amount of space necessary in which to mount the steerer which has increased the number of places where such a steerer may be installed. This compactness is a particular advantage in larger boats where secondary steering stations are desirable.

As a part of the installation versatility of the subject system is a mounting system through which the angle of the steering wheel may be easily set or adjusted without in any way disrupting or modifying the operation of the control system.

Further, applicants' unique design has resulted in an inordinately lightweight system relative to its load carrying capacity as a result of which it is easily installed by the manufacturer and from the owner's point of view adds much less weight to the boat and compared with previous mechanical steerers of corresponding load carrying capacity.

The subject remote control system comprises three major parts and including a control head which is mounted near the operator and, in the case of a marine steerer, would include the steering wheel. The next major component of the system is the control assembly mounted remote from the operator, e.g., on or near the transom of a boat, and which includes a unique telescoping tubular mechanism which also contributes importantly to the overall light weight and low cost of the system. The final general component of the system is the flexible conduit and cable device which interconnects the control head with the control assembly.

The flexible cable preferably utilized with the subject system includes a wire helically wrapped around a plurality of stranded wire elements so as to provide spaced convolutions the latter which coact with a gear member to transmit driving motion to the system. In general, this type of motion transmitting system has been used in the past, however, the subject system includes a unique cable driving gear arrangement which enables a relatively small double purpose gear member to transmit relatively high torque loads between a steering wheel and a member such as a steerable outboard motor. The double purpose gear member is uniquely formed to provide a first set of gear teeth coacting with a steering wheel driven pinion gear and a second set of centrally and symmetrically disposed helical gear teeth for engaging the drivable cable member.

A still further unique part of the subject control system is the telescopic tubular assembly which coacts with the flexible conduit in a manner providing a motion transmitting assembly having a greatly improved load capacity per pound of weight than similar devices used in the past. The telescopic assembly includes a unique combination of fixed and slidable concentric tubular members within which the flexible conduit is disposed in such a manner as to reinforce the rigidity of the tubular members at the same time permitting the use of lighter weight and lower cost tubular members than previously possible.

The details as well as other objects and advantages of the present invention will be apparent from a perusal of the description taken in conjunction with the drawings.

In the drawings:

FIGURE 1 is a plan view of a boat embodying the subject invention for transmitting drive from a steering wheel to a dirigibly mounted member at the rear of the boat;

FIGURE 2 is an enlarged partially sectional view of the telescopic tubular assembly mounted at the boat transom;

Figure 3:
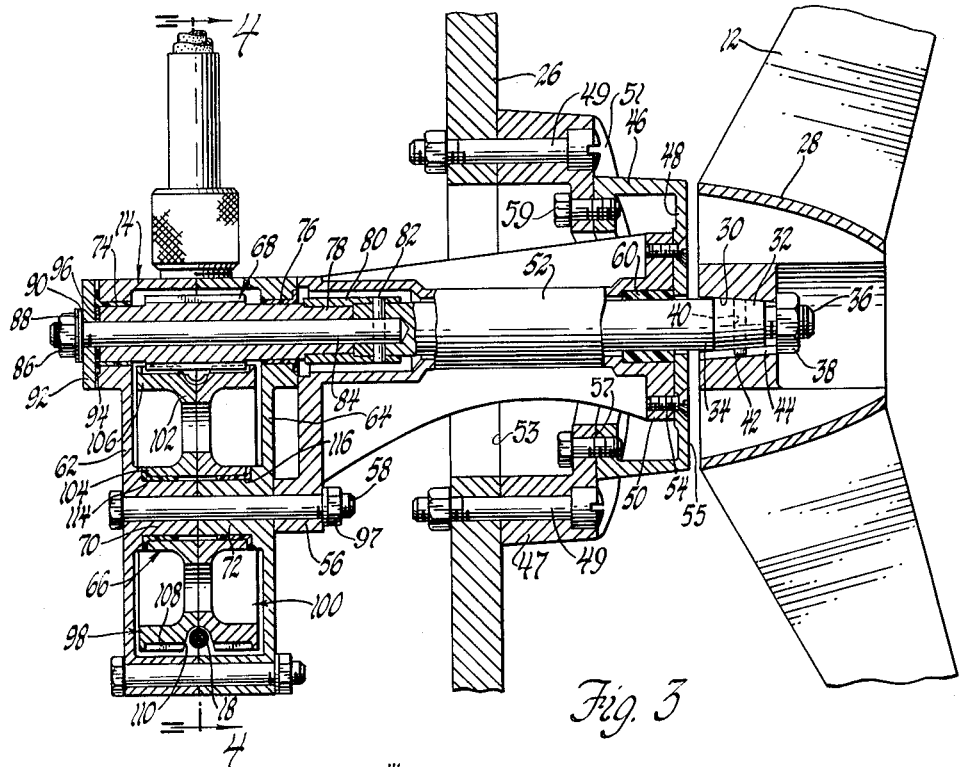
FIGURE 3 is an enlarged sectional view showing the control head including the steering wheel and flexible cable driving gear mechanism.

FIGURE 1 illustrates the subject invention as adapted to provide a steering control mechanism for a boat indicated generally at 10. In general the steering system includes a control head having a steering wheel 12, a cable driving gear mechanism 14 suitably connected to the steering wheel, a flexible conduit 16 slidably supporting a driving cable 18, and a telescopic tubular assembly 20 articulated to the boat transom 22. Telescopic assembly 20 is articulated to a rigid arm 24, in turn secured to the device, e.g., outboard motor, being steered.

Figure 4:
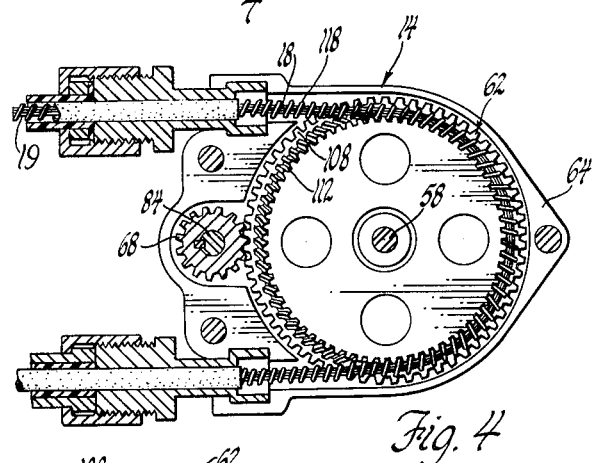
FIGURE 4 is a view along line 4—4 of FIGURE 3.

Referring to FIGURES 1 and 4, it is to be noted that flexible cable is wrapped about driving gear 66 through approximately 180°. One portion of the cable extends through flexible conduit 16 and is secured at one end to the telescopic assembly 20, infra. The other end 19 of cable 18 is free and of sufficient length, e.g., 18 inches, to move into and out of gear mechanism 14 during steering operation without permitting the cable to become disconnected from gear 66.

Steering wheel 12 is secured to a convenient member of the boat such as a dashboard 26 which extends generally transversely to the boat center line. Hub 28 of steering wheel 12 includes a tapered central opening 30 through which the tapered end 32 of a shaft 34 extends and which includes a threaded portion 36 adapted to receive a nut 38. To assemble wheel 12 to shaft 34 and establish a driving connection therebetween, a diametral opening 40 is formed transversely of the shaft and is adapted to receive a pin 42. An arcuate sleeve member 44 includes a hole also adapted to receive pin 42. Tapered end 32 of shaft 34, pin 42 and arcuate sleeve member 44 are inserted within the tapered wheel hub opening 30 whereby threaded shaft portion 36 extends through and beyond the hub opening. Nut 38 is then threaded on shaft portion 36 whereby the shaft, pin and sleeve member are drawn into tight frictional engagement with the hub whereby the steering torque may be transmitted from the wheel 12 to the shaft.

A bezel plate 46 is secured at wall portion 48 to a flange 50 of a tubular shaft supporting member 52 through suitable screws 54. The other end of tubular member 52 includes a second flange portion 56 which is secured to and supports the cable driving gear device 14 through a central stud member 58.

Flange portion 50 of tubular member 52 includes a recessed portion adapted to receive a journal bearing 60 which rotatably supports one end of shaft 34.

Figure 5:
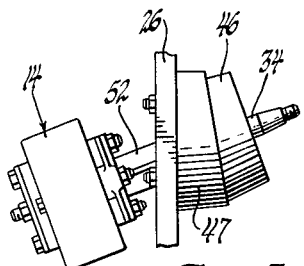
FIGURES 5 and 6 show a bezel plate arrangement through which the angle of the steering wheel may be adjusted.
Figure 6:
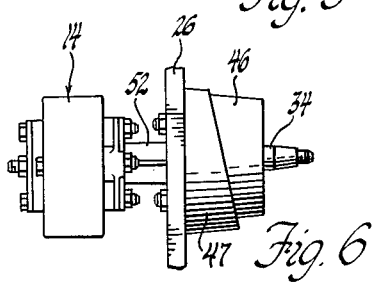

Bezel plate 46 is mounted on dashboard 26 through an intermediate plate 47 which is secured to the latter through bolts 49. Plate 47 includes a face 51 inclined to dashboard abutting face 53 the latter which is perpendicular to the rotative axis of steering wheel shaft 52. Bezel plate 46 also includes a face 55 perpendicular to the rotative axis of shaft 52 and a face 57 inclined to face 55. Bezel plate face 57 is secured through bolts 59 to face 51 of intermediate plate 47. A plurality of holes are formed in plate faces 51 and 57 whereby bolts 59 may be removed and plate 46 rotated relative to plate 47, as best seen in FIGURES 5 and 6, to change the angle of steering wheel 12 relative to dash 26.

Cable driving gear device 14 includes a casing comprising two identical portions 62 and 64 which are adapted to be secured together to enclose and support a gear member 66 and a driving pinion 68. Casing members 62 and 64 include inwardly extending cylindrical portions 70 and 72 which coact to provide a fixed shaft which rotatably supports gear member 66.

Matching casing members 62 and 64 include aligned openings having bearing sleeves 74 and 76 respectively disposed therein for rotatably supporting pinion gear 68 therewithin. Pinion 68 includes an integral shaft portion 78 which extends in the direction of wheel 12 and terminates in coaxial alignment with the inner end of shaft 34. Pinion shaft 78 and shaft 34 are coupled together through a sleeve 80 press fitted to the respective members and a pin 82 which diametrically extends through registering openings in the sleeve and shaft 34. Additionally, a stud member 84 extends concentrically through pinion 68 and includes an inner end fixed for rotation with pinion 68 and shaft 34 by pin 84 which also extends through a diametral opening in the inner end of the stud member. The other end of stud member 84 is threaded and is adapted to receive a nut 86 which is spaced from casing member 62 by a pair of washer members 88 and 90. Thrust plate member 92 is disposed intermediate washers 88–90 and casing member 62. Journal bearing 74 is preferably formed of a plastic material such as nylon and includes a radial flange portion 94 which abuttingly engages thrust plate 92. An additional plastic washer member 96 is disposed concentrically within bearing flange 94 and is abuttingly disposed between thrust plate 92 and the end of pinion shaft 78. Washer 90 is also most preferably formed of a plastic material such as nylon to facilitate rotation of stud 84.

During normal steering operation, wheel 12 imparts rotation to pinion 68, stud 84 and nut 86. By adjusting the tightness with which washer 90, thrust plate 92, washers 74 and 96 are axially pressed together, the rotary frictional drag imposed on pinion 68 and hence on the steering system may be varied. The purpose of providing means for introducing an adjustable drag into such a system is to help resist or absorb the torque which is introduced into the system by the member, e.g., motor, rudder, etc., being controlled. In other words, in operating a boat the pressure or reaction from water acting on the motor or rudder tends to cause the same to be rotated about its dirigible axis and this unwanted steering effort is, in turn, transmitted back to the steering wheel and increases the steering effort and attention required by the operator. In the present device, it is possible to introduce a controlled amount of resistance to eliminate or greatly diminish the aforementioned tendency of the member being steered to upset the predetermined steering attitude of the member and thereby enabling the operator to more easily stay on course or to even stay on course with the steering wheel being unattended for short periods of time.

If desired a similiar type of drag can be introduced into gear 66 by controlling the tightness with which stud nut 97 draws casings 62 and 64 into engagement with the radial flanges 100 and 102 of bearings 104 and 106.

As already indicated, it was generally old prior to the present invention to provide a steering wheel actuated gear arrangement capable of driving a flexible cable for a marine steering system. However, such devices had significant disabilities which greatly limited the use of this type of marine steerer due to the cost and undesirable bulk if such steerer was designed to withstand the range of operating loads encountered.

In the first place, with the present type system it is necessary to provide a dual purpose member which in effect is a gear within a gear. The first portion of such gear must provide the means for receiving the input drive from a steering wheel controlled gear or pinion and a second portion which transmits the drive to the flexible cable member. In the past, this type of gear member has been extremely costly to manufacture since its dual gear function required it to be machined from a high quality steel stock to withstand and transmit the considerable driving loads. In general, such gear member was formed or fabricated in either of two ways: (1) the gear blank was first machined to provide a first set of teeth adapted to coact with the steering wheel driven pinion after which the gear was further machined to provide a separate and distinct set of helical teeth adapted to drive the flexible cable member. (2) Alternatively, the gear blank was machined to provide the pinion engaging teeth after which a separate cable driving gear member was integrally secured to the basic gear member. In either of these cases, the restaurant dual purpose gear member was both costly and bulky.

An important feature of the present control system has been the development of a unique dual purpose gear member which has extremely high load carrying capacity and is considerably less expensive than any such device known in the past.

Figure 7:
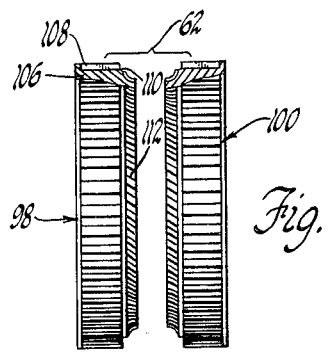
FIGURE 7 shows an exploded view of the double purpose cable driving gear member.

Reference is now made to FIGURES 3, 4 and 7 of the drawings. Gear member 62 is actually of a two part construction and includes identical halves 98 and 100. Each gear half includes a central web portion 102 having axially extending hub and rim portions 104 and 106. The exterior surface of each rim portion 106 is formed to provide gear teeth members 108 thereon which constitute one-half of a first set of teeth. Further, each web and rim portions 102 and 106 are formed at their juncture to provide an annular arcuate section 110 having helically disposed teeth 112 formed therein. The identical gear half portions 98 and 100 are secured together at their central web or radial flange portions 102 so that teeth 108 are aligned, although axially spaced, to provide a first set of exteriorly exposed teeth. At the same time, teeth 112 are juxtaposed to form a set of recessed helical teeth interposed within the first set of teeth.

It is apparent, therefore, that an otherwise very difficult to form gear member is relatively easily formed without the necessity of complicated and costly machining operations. As a matter of fact, it is now possible to die cast each of the gear halves of a material such as aluminum which entirely eliminates any machining operation and yet which provides a gear member having spur and helical gear portions. This development alone has resulted in a many fold reduction in the cost of such a dual purpose gear which also has further advantages not realized by previous type gear members intended for similar purposes.

A very important feature of the dual purpose gear member 62 is the central disposition of the helical teeth 112. In the past it has been necessary to mount or otherwise form the helical cable driving portion of the gear member in an off-center position relative to the radial center line of the gear member. Driving the cable from such an off-center position causes a moment arm tending to cock the gear resulting in unequal bearing loads and consequent excessive bearing wear. As is clearly seen in FIGURES 3 and 7, the central disposition of the helical gear teeth 112 results in a symmetrical disposition of loads on the bearing members.

Cylindrical bearing members 114 and 116, preferably formed of a low frictional resistance plastic material such as nylon, are mounted on cylindrical portions 70 and 72 respectively of casing members 62 and 64. Bearing members 114 and 116 include radial flange portions which insure that a low friction bearing surface is disposed between both the adjacent axial and radial surfaces of casing members 62 and 64 and hub portions 104 of gear member 62.

Not only does the unique construction of gear member 62 result in a symmetrically loaded gear, but as already noted, also permits the gear to inexpensively be formed through die casting which eliminates machining and allows the use of a lightweight-low cost material such as aluminum. The appropriate load carrying capacity, particularly with respect to teeth 108, is achieved by making these teeth and pinion gear 68 of an adequate axial width.

Referring to FIGURES 2 and 4, cable 18 comprises a core member formed from a plurality of wire members laid with a long lead and wrapped with a heavier wire 118 in the form of a helix on a short lead and in which the convolutions are spaced axially of the core. The helical lead of cable wire 118 is matched with that of the helical teeth 112 of cable driving gear member 62. Thus, the cable helix wire 118 and the helical gear teeth 112 coact to drive cable 18 through a push-pull movement within conduit 16 in accordance with the rotation of wheel 12. This type of arrangement provides an extremely high load transmitting system particularly adapted to marine steering applications.

Cable 18 is adapted to be slidably supported within flexible conduit 16 which may be of the type shown in copending application S.N. 214,398 Tenreiro, filed August 2, 1962. In environments where high loads are being transmitted between the input and output members, such as in a marine steering system, it is important that conduit 16 also be of a capacity adapted to withstand the high reaction forces which are transmitted thereto by cable 18. Primarily, conduit 16 must have a high hoop strength or radial load capacity while at the same time being flexible enough to permit the conduit to be conveniently disposed within the boat, vehicle, or the like, within which the system is embodied.

In general, flexible conduit 16 includes a low frictional resistance inner member such as a flexible plastic inner liner, a plurality of wire members overlaid upon the inner liner on a relatively long lead and adapted to primarily withstand conduit tension loads, and a plurality of wire or filament elements wrapped on a short lead to increase the conduit hoop strength, and over all of which is extruded a plastic sheath or jacket. These constructional details are shown in the aforementioned Tenreiro application. It is appreciated, of course, that the invention is in no way limited to a precise cable or conduit configuration and those described simply represent a preferred form which has proven to be highly successful.

Inasmuch as the subject remote control system utilizes a flexible cable and conduit for transmitting motion over a considerable distance and, further, inasmuch as it is imperative to translate input motion to output motion with a maximum efficiency, the construction of the telescopic assembly 20 is a very important part of the subject system. Expressed in a slightly different way, if the flexible cable were directly connected to motor arm 24 without the provision of a rigid cable-conduit supporting means disposed proximate the connection of the cable to the arm, the tension and compression forces to which the cable and conduit would be subjected in steering the motor would cause a certain amount of flexing or bending of the cable and conduit with a resultant loss in movement between the steering wheel and the motor. To avoid this difficulty and also to provide a greatly improved mechanism, a unique telescopic assembly 20 has been developed.

In the illustrated system, telescopic assembly 20 is pivotally articulated to the boat transom 22 through a stud member 120 which terminates at the inboard end thereof in a ball member 122. Ball member 122 in turn coacts with a spherically shaped socket formed in a bracket member 124. Bracket 124 is suitably clamped to telescopic assembly 20 through bolt members 126. Thus, while telescopic assembly 20 is substantially rigid, it is supported for universal pivoting about ball member 122.

A similar ball stud member 128 is loosely articulated at one end to motor arm 24 through bolt 130. The other end of ball stud 128 is loosely disposed within a socket 132 formed in assembly member 134. A slidable sleeve 136, infra, retains ball stud member 128 within socket 132.

Telescopic assembly 20 includes an outer tubular member 138 within which a second tubular member 140 is slidably supported. One end of slidable tubular member 140 is disposed exteriorly of support tube 138. The other end of tubular member 140 is always disposed within tubular member 138 and terminates substantially short of the end of the support tube most remote from ball stud member 128.

Ball stud engaging member 134 is suitably secured within the exterior end of slidable tube 140 by any suitable means such as crimping, swaging or the like. Since member 134 is disposed within tubular member 140, the adjacent end of the latter provides a shoulder which supports one end of a coil spring member 142 concentrically disposed about the member. The other end of spring 142 biases against sleeve member 136 slidably disposed on member 134. A washer member 144 is suitably secured to the end of member 134 and retains sleeve 136 on said member. Sleeve 136 is suitably slotted to closely fit around the reduced neck portion 146 of ball stud member 128. To connect the telescopic assembly 20 to ball stud member 128, sleeve 136 is retracted against the force of spring 142 to permit the insertion of ball 148 within socket 132. After the ball is properly seated, sleeve 136 is released whereby spring 142 will cause the sleeve to move axially outwardly relative to member 134 and thereby lock the ball stud member to said member.

As viewed in FIGURE 2, the right end of support tube 138 is internally threaded to receive an externally threaded sleeve member 150 which, in turn, has one end of a tubular member 152 fixed thereto. Tubular member 152 is substantially longitudinally coextensive with outer support tube 138. Thus, slidable tubular member 140 is concentrically disposed between non-movable tubular members 138 and 152.

Flexible conduit 16 it tightly fitted within the inner tubular member 152 and terminates against a stop member 154 retained by the rolled over end 156 of tubular member 152.

Cable 18 is suitably connected to the enlarged end 158 of a rod member 160, slidably supported within conduit 16 and stop member 154. The other end of rod 160 is threadably connected to ball stud engaging member 134. With the telescopic subassembly parts in the position shown in FIGURES 1 and 2, the slidable tubular member 140 is in its fully retracted position. From this position the tube will progressively move to the left toward a mid position in which the motor or steering mechanism would be in a neutral position and moved therebeyond to a fully extended position in which the boat would be turning in the opposite direction from that in which the slidable tubular member is in its fully retracted position.

In the past in making telescopic members adapted to transmit relatively heavy push-pull loads, it has been the practice to employ relatively heavy tubular or solid rod members. Insofar as they are aware, the applicants were the first to recognize that notwithstanding its flexible character, a confined flexible conduit such as 16 when confined within tubular members, as shown in the present invention, in itself has a reinforcing effect in the total assembly and importantly contributes to radial or hoop strength of the assembly with the result that relatively thin lightweight and hence low cost tubular members may be utilized in constructing such a telescopic subassembly. Thus, it is an important feature of subassembly 20 that flexible conduit 16 extends within tubular member 152 and hence importantly contributes to the overall strength of the telescopic assembly.

To provide sufficient radial load strength inner tubular member 152 would normally be formed of a thick wall tube stock in order to withstand the radial loads transmitted thereto in loading the cable in compression. However, it has been found that since conduit 16 is basically able to withstand radial cable loads, the conduit is extended through and structurally incorporated in telescopic assembly 20. Therefore, instead of a heavy wall tubular member, a very lightweight member 152 may be combined with conduit 16 to provide an improved and light weight assembly.

Figure 8:
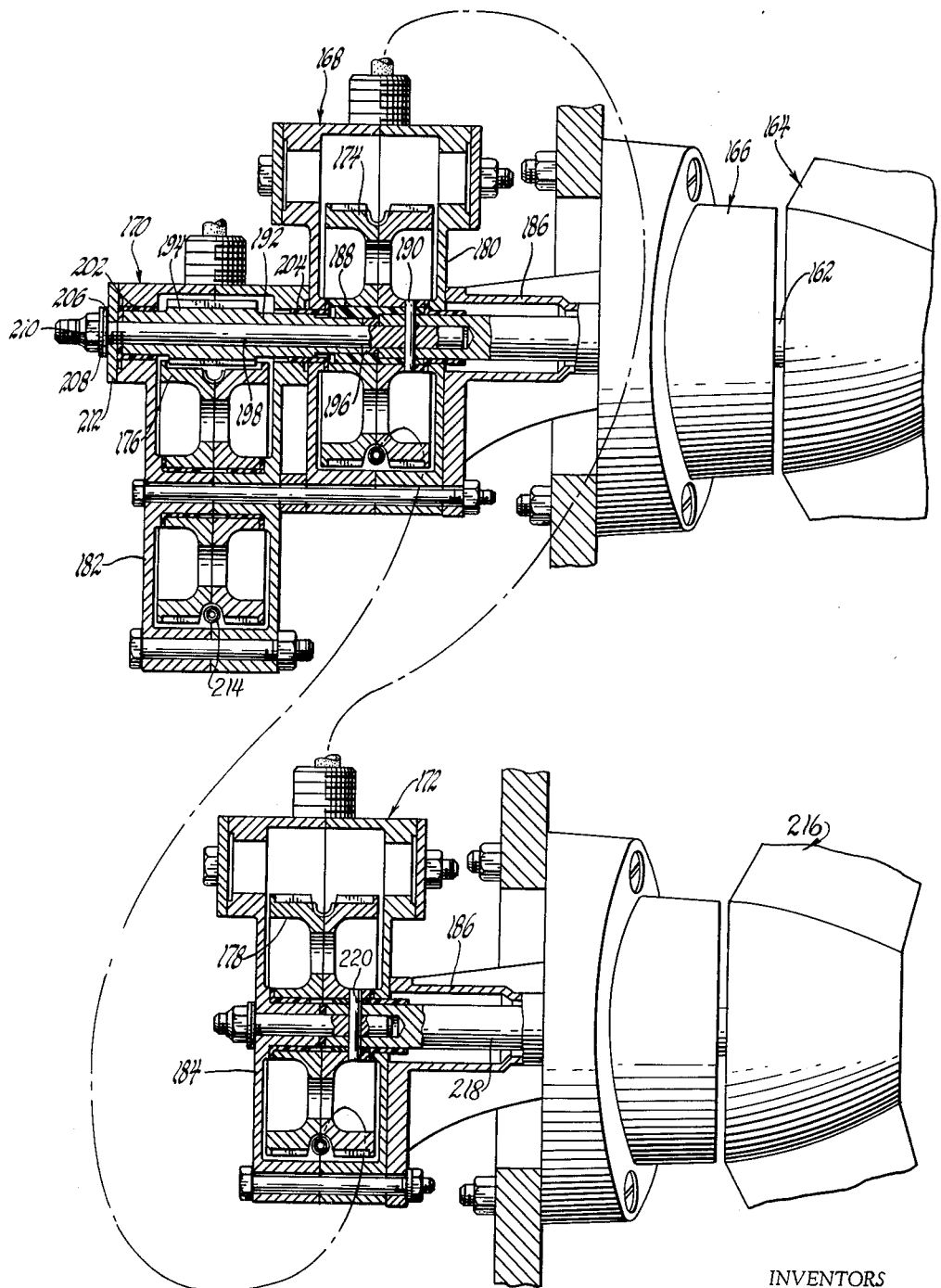
FIGURE 8 is a modification of the invention adapted to provide a secondary steering station.

An important modification of the subject invention is shown in FIGURE 8 and is characterized as a master-slave system in which a plurality of input members may be employed.

Referring specifically to FIGURE 8, a shaft 162 is connected in the manner previously described to a steering wheel 164 and is, in turn, supported in the same manner upon bezel ring assembly member 166. In this modification, however, a plurality of cable driving gear mechanisms 168, 170 and 172 are provided and interconnected to permit steering from a plurality of stations. Except to the extent subsequently described, cable driving gear mechanism 170 is the same as that previously described with respect to the mechanism shown in FIGURES 1 through 3. Gear mechanism 168 and 172 are adaptations of the previously described cable driving mechanism but in this case they have been modified and are part of a slave control or steering system through which a secondary steering station is connected to the primary station.

The form, construction and the cable coaction of the dual purpose gear elements 174, 176 and 178 of cable driving mechanisms 168, 170 and 172 are identical and the same as described with respect to the single station control system of FIGURES 1 through 7. Likewise, the two-part casing members 180, 182 and 184 are the same as previously described. Steering wheel shaft supporting tube member 186 is also the same as in the earlier described modification.

Steering wheel shaft 162 terminates at one end approximately half way through the hub of gear member 174. A tubular sleeve 188 is press fitted within the hub of gear member 174 and is generally longitudinally coextensive therewith. Shaft 162 is drivingly connected to gear member 174 by a pin member 190 which diametrically extends through the shaft, sleeve 188 and the hub of gear member 174.

Shaft 192 of the pinion gear member 194 of gear mechanism 170 is coaxially aligned with steering wheel shaft 162 and extends at one end through casing 180 terminating within the hub of gear member 174. An annular spacer member 196 is disposed between the adjacent ends of steering wheel shaft 162 and pinion shaft 192.

A rod member 198 once again extends through pinion gear 194 and is secured to steering wheel shaft 162 by pin 190 which extends through a diametral opening in such rod. The pinion gear shaft 192 is again rotatably supported within the associated casing members upon low frictional resistance bearing members 202 and 204. A low frictional resistance washer member 206, which may be formed of a material such as nylon, and a conventional metal washer 208 are disposed on rod 198 intermediate and adjustable nut member 210 and a thrust plate 212. As in the earlier modification, by adjusting nut 210 a controlled drag may be imposed on pinion 194 supra.

As in the single station steering system of FIGURES 1 through 7, master control gear mechanism 170 is operatively connected to the telescopic steering assembly 20 through flexible cable 214. Slave or secondary steering station gear member 178 is directly coupled to its steering wheel 216 and shaft 218 through diametral pin 220 which connects the gear member hub with the shaft. In this case, the secondary station wheel 216 drives directly to gear member 178, rather than through a pinion gear. Cable member 222 connects directly with gear member 174 of device 168. Since gear member 174 is coupled directly to pinion gear 194, the secondary driving action will then be transmitted to master gear member 176, through cable 214 to the telescopic assembly 20.

It is an important aspect of the multiple steering station arrangement that the secondary or slave station transmit drive through the master gear device 170 and more specifically through pinion gear 194 to maintain the mechanical advantage of the basic system. Thus, the coaxial and interconnected relationship between slave cable gear member 174 and pinion 194 is significant.

Various structural modifications may be made within the intended scope of the above-described and illustrated invention as set forth in the hereinafter appended claims.

We claim:
1. A motion transmitting mechanism comprising a two part gear member, each part of said gear member including a radial web portion, a hub portion at the radially inner end of said web portion, a rim portion extending from the radially outer end of said web portion, gear teeth formed on each of said rim portions, partial gear teeth formed on each part of said gear member proximate the junction of said rim and web portions, said gear parts being secured together such that the teeth on each of said rim portions coact to form a first set of gear teeth and the partial teeth of each part are disposed in abutting relation and coact to form a second set of gear teeth, a gear element drivably coacting with said first set of gear teeth to rotate said gear member, and a second element drivably coacting with said second set of gear teeth.

2. A motion transmitting mechanism comprising a two part gear member, each part of said gear member including a radial web portion, a hub portion extending axially from the radially inner end of said web portion, a rim portion extending from the radially outer end of said web portion, gear teeth formed on each of said rim portions, partial gear teeth formed on each part of said gear member proximate the junction of said rim and web portions, said gear parts being secured together such that the teeth on each of said rim portions coact to form a first set of gear teeth and the partial teeth of each part are disposed in abutting relation and coact to form a second set of gear teeth, a gear element drivably coacting with said first set of gear teeth to rotate said gear member, and a flexible cable element drivably coacting with said second set of gear teeth.

3. A motion transmitting mechanism comprising a two part gear member, each part of said gear member including web, hub and rim portions, said parts being secured together such that the rim portions coact to form two sets of external gear teeth, a part of each set of gear teeth being formed on the rim portion of each gear part, the first of said two sets of gear teeth extending substantially across the axial width of the coacting rim portions, the second of said two sets of gear teeth being disposed centrally of the two part gear member intermediate the axial ends of said first set of gear teeth and first and second elements respectively drivably coacting with said first and second sets of gear teeth.

4. A motion transmitting mechanism as set forth in claim 1 in which said mechanism includes a casing for rotatably supporting said two part gear member and said gear element, bearing elements respectively disposed intermediate said casing and said two part gear member and said gear element, and means for respectively adjustably controlling the frictional drag between said casing and said gear member and said gear element.

5. A motion transmitting mechanism as set forth in claim 1 in which said mechanism includes a casing for rotatably supporting said two part gear member and said gear element, a portion of said gear element extending exteriorly of said casing, bearing means disposed between said exteriorly extending portion and said casing, and means for adjustably controlling the force with which said exteriorly extending portion presses the bearing means against the casing.

6. A remotely controlled steering mechanism comprising a dashboard, a steering wheel, a steering shaft secured at one end for rotation with the steering wheel and the outer end extending through an opening in said dashboard, a motion transmitting mechanism drivably connected to said other end of the steering shaft, a device for supporting said steering wheel and motion transmitting mechanism upon said dashboard so that said wheel and motion transmitting mechanism are axially spaced and cantilever supported from said dashboard, said device comprising a pair of plate members coaxially disposed about said steering shaft, one plate member rotatably supporting said shaft, said plate members including abutting planar faces, at least one of said planar faces being inclined other than perpendicularly to the steering shaft axis, relative rotation of said plate members about the steering shaft axis varying the angle of said shaft relative to said dashboard, a dirigible device remotely disposed relative to the steering wheel, and a flexible drive transmitting cable operatively connected between the motion transmitting mechanism and the dirigible device.

7. A remotely controlled steering mechanism as set forth in claim 6 in which one of said plate members includes a pair of non-parallel flat surfaces, said one plate member being secured to said dashboard so that one of said surfaces abuts thereagainst, the other plate member also including a pair of non-parallel flat surfaces, said other plate member being mounted upon said one plate member so that one surface thereof abuts against the other surface of said first member.

8. A remotely controlled steering mechanism as set forth in claim 7 in which the said other plate member of said supporting device includes a portion for rotatably supporting said steering wheel shaft.

9. A remotely controlled steering mechanism as set forth in claim 7 in which the said other plate member of said supporting device includes a portion for rotatably supporting said steering wheel shaft, said portion extending through said dashboard and supporting said motion transmitting mechanism.

10. A remotely controlled steering mechanism as set forth in claim 6 which includes a telescopic assembly mounted proximate said dirigible device, said assembly including a first tubular member, a support structure, bracket means mounting said tubular member upon the support structure for pivoting movement, a second tubular member fixedly supported at one end within said first tubular member and radially spaced therefrom throughout most of its length, a third tubular member slidably disposed between said first and second tubular members and including one end extending axially beyond said first tube, said one end of the third tubular member being articulated to said dirigible device, a flexible conduit slidably supporting said flexible cable and including one end portion fixed within said second tubular member and extending substantially throughout the length thereof, a rigid member slidably disposed within said conduit and including one end extending beyond said second tubular member and being secured to said third tubular member proximate the end thereof extending beyond the first tubular member, the other end of said rigid member terminating within said second tubular member and being secured to said flexible cable for sliding movement therewith.

11. A remotely controlled steering mechanism comprising a dashboard, a steering wheel, a steering shaft secured at one end for rotation with the steering wheel and the other end extending through an opening in said dashboard, a motion transmitting mechanism including a casing, first and second externally meshing gear elements rotatably supported in said casing, said first gear element being fixed to the other end of said shaft, said second gear element including a circumferential groove formed centrally thereof, a device for supporting said steering wheel, and motion transmitting mechanism upon said dashboard so that said wheel and motion transmitting mechanism are axially spaced and cantilever supported from said dashboard, a dirigible device remotely disposed relative to the steering wheel, and a flexible drive transmitting cable disposed within said circumferential groove drivably connecting the second gear element and the dirigible device.

12. A remotely controlled steering mechanism as set forth in claim 11 in which said flexible cable drivably engages the outer periphery of said second gear element and is wrapped substantially 180° thereabout.

13. A remotely controlled steering mechanism as set forth in claim 12 in which said first gear element is substantially smaller than said second gear element and engages therewith in the area free of said flexible cable.

14. A remotely controlled steering mechanism comprising a dashboard, a steering wheel, a steering shaft secured at one end for rotation with the steering wheel and the other end extending through an opening in said dashboard, a motion transmitting mechanism drivably connected to said other end of the steering shaft, a device for mounting said steering wheel, and motion transmitting mechanism upon said dashboard, a dirigible device remotely disposed relative to the steering wheel, a flexible drive transmitting cable operatively connected between the motion transmitting mechanism and the dirigible device, a telescopic assembly mounted proximate said dirigible device, said assembly including a first tubular member, a support structure, bracket means mounting said tubular member upon the support structure for pivoting movement, a second tubular member fixedly supported at one end within said first tubular member and radially spaced therefrom throughout most of its length, a third tubular member slidably disposed between said first and second tubular members and including one end extending axially beyond said first tubular member, said one end of the third tubular member being articulated to said dirigible device, a flexible conduit slidably supporting said flexible cable and including one end portion fixed within said second tubular member and extending substantially throughout the length thereof, a rigid member slidably disposed within said conduit and including one end extending beyond said second tubular member and being secured to said third tubular member proximate the end thereof extending beyond the first tubular member, the other end of said rigid member terminating within said second tubular member and being secured to said flexible cable for sliding movement therewith.

15. A remotely controlled steering mechanism comprising primary and secondary dashboards, a primary steering wheel, a shaft secured at one end for rotation with the primary steering wheel, first and second motion transmitting mechanisms, the other end of said shaft extending through an opening in the primary dashboard and being drivably connected to said first and second mechanisms, a secondary steering wheel, a shaft secured at one end for rotation with said secondary steering wheel, a third motion transmitting mechanism, the other end of said secondary steering wheel shaft extending through an opening in the secondary dashboard and being drivably connected to said third motion transmitting mechanism, a first device supporting said primary steering wheel and said first and second motion transmitting devices upon said primary dashboard so that said wheel and said mechanisms are cantilever supported from said dashboard, a second device supporting said secondary steering wheel and said third motion transmitting mechanism upon the secondary dashboard so that said wheel and mechanism are cantilever supported upon said dashboard, a dirigible device remotely disposed relative to said steering wheels, a first flexible cable drivably connecting said first and third motion transmitting mechanisms, and a second flexible cable drivably connecting said second motion transmitting device and said dirigible device, each of said motion transmitting mechanisms including at least one gear member identical to a corresponding gear member in the other mechanisms, said identical gear members being respectively drivably connected to said first and second flexible cables.

16. A remotely controlled steering mechanism as set forth in claim 15 in which said second motion transmitting mechanism includes a pinion gear meshing with said one gear member, said pinion gear and the said one gear member of said first motion transmitting mechanism being directly connected to said primary steering wheel shaft.

17. A remotely controlled steering mechanism as set forth in claim 21 in which each identical gear member comprises a two part gear member, each part of said gear member including a radial web portion, a hub portion at the radially inner end of said web portion, a rim portion extending from the radially outer end of said web portion, gear teeth formed on each of said rim portions, partial gear teeth formed on each part of said gear member proximate the junction of said rim and web portions, said gear parts being secured together such that the teeth on each of said rim portions coact to form a first set of gear teeth and the partial teeth of each part are disposed in abutting relation and coact to form a second set of gear teeth, the first set of teeth of the identical gear member of the second motion transmitting mechanism meshing with the pinion gear, the second set of teeth of each identical gear member respectively drivably engaging the first and second flexible cables.

References Cited by the Examiner

UNITED STATES PATENTS

| | | | |
|---|---|---|---|
| 1,220,775 | 3/17 | Murray | 74—449 |
| 1,932,315 | 10/33 | Klock | 74—494 |
| 1,983,962 | 12/34 | Barber et al. | 74—501 X |
| 2,890,595 | 6/59 | Loeffler I | 74—480 |
| 2,926,545 | 3/60 | Loeffler II | 74—493 |
| 3,135,130 | 6/64 | Bentley. | |

BROUGHTON G. DURHAM, *Primary Examiner.*

MILTON KAUFMAN, *Examiner.*